April 24, 1956    LE ROY V. JACOBSEN ET AL    2,742,707
ELECTRICAL DEVICE FOR MEASURING ANGLES
Filed March 12, 1951
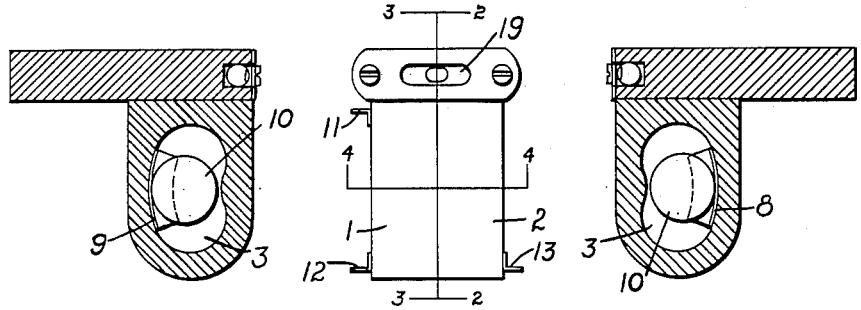
FIG-2    FIG-1    FIG-3
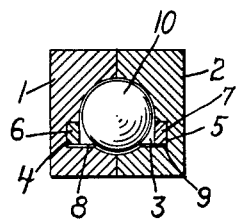   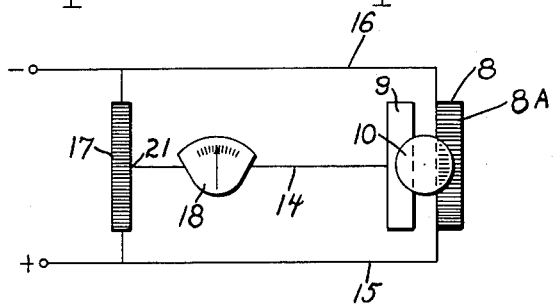
FIG-4    FIG-5
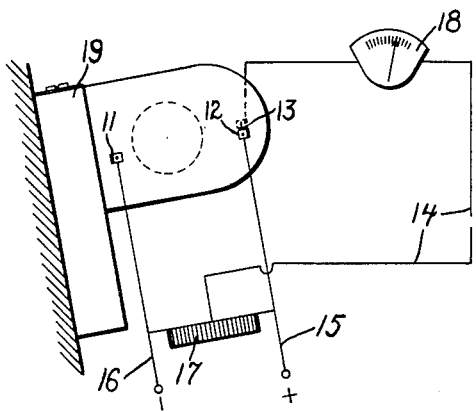
FIG-6
INVENTOR.
L.V. JACOBSEN
F.G. BAKER
BY
Merrill M. Blackburn
Atty.

United States Patent Office 2,742,707
Patented Apr. 24, 1956

2,742,707

ELECTRICAL DEVICE FOR MEASURING ANGLES

Le Roy V. Jacobsen, Durant, and Forrest G. Baker, Davenport, Iowa, assignors to Bee-Line Company, Davenport, Iowa, a copartnership Application March 12, 1951, Serial No. 215,166

10 Claims. (Cl. 33—206)

Our present invention relates to means for determining angles of structures, either vertical or horizontal, but, for convenience in explanation, its application in the measuring of vertical angles will be set forth. It is understood that, in the geometry of automobiles, the inclination of the front wheels from the vertical plane is spoken of as the camber of the vehicle. It has been customary to measure this angle by mechanical means, such, for example, as shown by the Nichols patent, No. 1,702,794, issued February 19, 1929. Attempts have been made, unsuccessively, to measure this angle electrically but, as far as we know, we are the first to successfully measure this angle accurately.

In the drawings annexed hereto and forming a part hereof,

Fig. 1 is a plan view of a structure embodying our present invention;

Fig. 2 represents a cross-section taken approximately along the plane indicated by the line 2—2 in Fig. 1;

Fig. 3 represents a cross-section taken approximately along the plane indicated by the line 3—3 in Fig. 1, in the opposite direction from Fig. 2;

Fig. 4 represents a cross-section taken approximately along the plane indicated by the line 4—4 in Fig. 1;

Fig. 5 represents, diagrammatically, the connection of this device with an electrical circuit; and Fig. 6 represents the connection thereof with apparatus for determining deviation of the apparatus from plumb.

Reference will now be made in greater detail to the annexed drawings for a more complete description of this invention. Preferably an insulating body consisting of the elements 1 and 2 is provided with arcuate concavities 3. These arcuate concavities have extensions 4 and 5 at the lower sides thereof, these being the sides which, with respect to the principal axis of curvature of the cavity form the radially outer side of the cavity in which insulating bars 6 and 7, preferably of plastic, are mounted for holding the strips of metal 8 and 9. The strip of metal 8 is wound with a minute resistance wire 8a which is about three thousandths of an inch (0.003″) in diameter. These strips are held in place by the strips 6 and 7. The strips 8 and 9 lie along the bottom surfaces of the extensions, which surfaces are, with respect to the principal axis of curvature of the cavity, radially inward from the central portion of the cavity, the latter being shaped to allow clearance for a conductive metal ball 10 to roll along the strips, held in contact by gravity with the adjacent edges of the strips. By "strip" in this sense is meant in the case of strip 8 the metal form with the winding thereon, since the metal form is no part of the electrical circuit. While the elements 1 and 2 are preferably made of plastic, they may be made of any insulating material, such as hard rubber or glass.

Preferably the concavities 3 are formed in the electrical insulating pieces 1 and 2, and the extensions 4 and 5 have the same arcuate shape as the concavities 3. The wire wrapped around strip 8 is so arranged that the silver coated ball 10, as it rolls from one end toward the other of the strip 8, changes its point of contact with the resistance wire 8a. This wire 8a on the strip 8 has its ends secured to the terminals 11 and 12 on the outside of the body. On the opposite side of the concavity 3, the strip 9 is embedded in the inside of the body, and outside of this body is a terminal 13 to which the strip 9 of the circuit is connected. A potentiometer 17 is connected between the power wires 15 and 16 and forms a connection for the voltmeter 18, which shows potential difference between points on resistances 8a and 17. The voltmeter 18 and the resistance wire 8a are connected by wire 14. Since there is essentially no resistance in wires 14, 15, and 16, practically all of the resistance is in wires 8a and 17, and all other resistance may be disregarded. Also, while we have mentioned resistance wire, it will be understood that carbon or other resistance may be substituted.

Current flows from the current source through the potentiometer 17 and the resistance wire 8a. As the ball 10 shifts toward one end or the other of the strip 8, there is a variation in the voltage at the contact point, and the difference in voltage between the contact point at resistance wire 8a and the contact point at potentiometer 17 is shown by the voltmeter. The voltmeter 18 indicates the voltage or potential difference between the point of contact of the arm of the potentiometer 17 and the point of contact of the ball 10 on the resistance wire 8a, through the strip 9.

A level 19 is fixed in the body of the device transversely of the plane of the arc of the arcuate cavities 3. When the device is moved to a position in which the level 19 registers level, the center plane of the arcuate cavities 3 will obviously be vertical, in which position the ball 10 will ride properly on the strips.

In order that this instrument may be in condition for use, it is necessary that it first be set at zero. To do this, the instrument is set level, as registered by the level 19, and with the device set against a known plumb surface, in which position the ball will assume a position corresponding to zero. Then the potentiometer 17 is adjusted until the voltmeter reads zero. The reading of both plus and minus angles will be most conveniently accomplished by use of a voltmeter of a type which has a zero at the center of the scale. The voltmeter we described is used to measure potential difference only and must have a resistance high enough so that its current requirements are small compared to the currents flowing through the potentiometer 17 and the resistance 8a. If the instrument is held against an object which is not plumb, and with level 19 registering level, the ball will be caused to roll toward one end or the other of the resistance, and the voltmeter will show a difference in potential. A master gauge is used to set this instrument.

Since any value can be assigned to one unit of the voltmeter dial, any amount stated must be understood to be arbitrary. The resistance of the wire 8a and the distance between the turns of wire will largely determine the value of one space on the voltmeter.

It is of course understood that the specific description of structure set forth above may be departed from without departing from the spirit of this invention, as disclosed in this specification and as defined by the appended claims.

Having now described our invention, we claim:

1. A device for the purpose indicated comprising a body formed from a pair of electrical insulating blocks having concavities formed therein, said concavities being arcuate in form, a metal strip inset into one wall of one of the concavities, a terminal on the outside of the body connected to the metal strip in the concavity in the block, a strip having a fine wire wound thereon, said last mentioned strip being embedded in the second wall of the body, terminals mounted on the outside of the body and connected to the ends of the wire, and a level mounted on said device transversely to the plane of the arc of said arcuate concavities, whereby said plane may be adjusted to verticality as indicated by said level.

2. A device for the purpose stated comprising a body of electrical insulating material having an arcuate concavity therein, a ball rollable in the concavity, said body having formed therein extensions of said cavity at the radially outer side thereof, metal strips mounted in the sides of the concavity and arranged in substantially the same arcuate form as the concavity, the metal strips being spaced slightly apart so that the ball may roll on the edges thereof, and insulating bars positioned in said cavity extensions and engaging said strips to hold them in said arcuate cavity.

3. A device for electrically determining angles, comprising a body having an arcuate cavity, a pair of conducting strips, one of them being a resistor, the other being of high electrical conductivity, the strips being arcuate in shape, the sides of the cavity having extensions formed therein of smaller dimension radially than the central portion of said cavity, the outer edges of said strips being arranged in said extensions with their inner edges in adjacent but spaced apart relation, a plurality of terminals outside of the body, the ends of the resistor being secured to the terminals, a terminal outside of the body connected to the second strip, and a metal ball held by gravity against said strips and rolling under the influence of gravity in said cavity and making contact with the adjacent edges of said strips in the arcuate cavity.

4. A device for the purpose stated, comprising insulating block means with an elongated cavity formed therein and extending longitudinally of said block means, oppositely arranged, approximately coplanar, lateral extensions at one side of said elongated cavity, the other side of said cavity being formed substantially semi-circular in cross-section, a pair of electrically separated strip-like members in said extensions with their inner edges in adjacent but spaced apart relation, at least one of said strip-like members being of resistance material, and a solid ball of conducting material in said cavity and having a diameter such that the ball fits snugly but movably in said semi-circular portion of the cavity and bridges across from the inner edge of one of said strip-like members to the inner edge of the other member.

5. A device as defined by claim 4, further characterized by said insulating block means being formed in two complementary mating parts, the plane of parting passing approximately centrally through said elongated cavity and lying approximately centrally between said strip-receiving extensions.

6. A device as defined by claim 4, further characterized by a pair of parts located in said lateral cavity extensions and acting to hold said strip-like members in position therein.

7. A device for the purpose indicated comprising a body formed from a pair of electrical insulating blocks having concavities formed therein, said concavities being arcuate in form, a metal strip inset into one wall of one of the concavities, a strip having a fine wire wound thereon, said last mentioned strip being embedded in the second wall of the body, means holding said strips in said concavities so that the inner edges of said strips are separated but located adjacent one another, said concavities being located in mutually mating relation, and a solid conducting ball located in said mating concavities and rollable along the inner edges of said strips.

8. A device for the purpose indicated comprising a body formed from a pair of electrical insulating blocks having concavities formed therein, said concavities being arcuate in form, a metal strip inset into one wall of one of the concavities, a terminal on the outside of the body connected to the metal strip in the concavity in the block, a strip having a fine wire wound thereon, said last mentioned strip being embedded in the second wall of the body, terminals mounted on the outside of the body and connected to the ends of the wire, a solid ball of conducting material rollable along the edges of said strips, and a level mounted on said device transversely to the plane of the arc of said arcuate concavities, whereby said plane may be adjusted to verticality as indicated by said level.

9. A device for the purpose indicated comprising a body formed from a pair of electrical insulating blocks having concavities formed therein, said concavities being arcuate in form, and each having a cavity extension at the radially outer side of the concavity, said extensions extending inwardly from the mating surfaces of said blocks, a first metal strip set into one of said extensions with its outer edge located a slight distance inwardly of the associated mating surface of the block, a strip having a fine wire wound thereon, said last mentioned strip being embedded in the other cavity extension with its outer edge located a slight distance inwardly of the associated mating surface of the block, a conducting ball rollable along the adjacent edges of said strips and lying in said mating concavities, and a level mounted on said device transversely to the plane of the arc of said arcuate concavities, whereby said plane may be adjusted to verticality as indicated by said level.

10. For use in an electrical device, an insulating body formed of two mating halves, each having an elongated concavity therein, substantially semi-circular in cross-section, said concavities being formed in the mating surfaces of said halves, and a strip-receiving cavity extension formed in each half, said extensions extending inwardly from the associated mating surface a distance farther than the associated semi-circular concavity.

References Cited in the file of this patent

UNITED STATES PATENTS

| | | |
|---|---|---|
| 470,942 | Mautner et al. | Mar. 15, 1892 |
| 1,342,594 | Parkin | June 8, 1920 |
| 1,955,746 | Inglis | Apr. 24, 1934 |
| 2,023,748 | Shipley | Dec. 10, 1935 |
| 2,120,771 | Thompson | June 14, 1938 |
| 2,137,485 | Greenleaf et al. | Nov. 22, 1938 |
| 2,202,987 | Egenas | June 4, 1940 |
| 2,256,833 | McDonald | Sept. 23, 1941 |
| 2,492,727 | Ballard | Dec. 27, 1949 |
| 2,511,525 | Bradwell | June 13, 1950 |
| 2,533,686 | Peterson | Dec. 12, 1950 |
| 2,611,188 | Bell | Sept. 23, 1952 |

FOREIGN PATENTS

| | | |
|---|---|---|
| 726,809 | Germany | Oct. 21, 1942 |
| 912,493 | France | Apr. 29, 1946 |